United States Patent Office 3,082,258
Patented Mar. 19, 1963

3,082,258
ALKYLATION OF PHENOLS
Wayne V. McConnell and Herman E. Davis, Kingsport, Tenn., assignors to Eastman Kodak Company, Rochester, N.Y., a corporation of New Jersey
No Drawing. Filed May 12, 1960, Ser. No. 28,557
6 Claims. (Cl. 260—624)

The present invention concerns the alkylation of phenols. A specific aspect of the present invention concerns the preparation of 2,6-ditertiary butyl-4-methylphenol.

A wide variety of alkylated phenols are known in the art. Many of such compounds have been found useful as antioxidants or stabilizers for plastics, chemicals and foods. Alkylated phenols can be prepared by reacting a phenol with an olefin in the presence of an acidic catalyst. However, many of such methods employed for preparing alkylated phenols result in low yields, a high degree of polymerization of the olefin which complicates the recovery and purification of the product, and undesirable color or odor. For food use it is particularly desirable that alkylated phenols be substantially white or colorless and substantially odor-free.

It is therefore an object of this invention to provide a new method for preparing alkylated phenols.

It is another object of this invention to provide a new high-yielding process for preparing alkylated phenols comprising reacting phenols and olefins.

It is another object of this invention to prepare alkylated phenols by a novel process wherein the alkylated phenol product has improved color and odor.

It is likewise an object of this invention to provide a new process employing an acid catalyst especially adapted for condensing phenols and olefins to form alkylated phenols.

It is also an object of this invention to provide a novel process for preparing 2,6-ditertiary-4-methylphenol.

These and other objects of the invention are accomplished by alkylating the nucleus of a phenol by reacting the phenol with an olefin under alkylating conditions in the presence of a catalytic amount of methane disulfonic acid or methane trisulfonic acid.

The phenolic reactant employed in the present process is an alkylatable phenol having at least one aromatic hydrogen atom. Particularly effective phenol reactants have aromatic hydrogen atoms in an ortho position with respect to the hydroxyl radical, although other positions on the aromatic ring having an aromatic hydrogen atom can also be alkylated in accordance with the invention. Typical phenolic reactants include phenol and such cresols and xylenols as 2-methylphenol, 3-methylphenol, 4-methylphenol, 2,3-dimethylphenol, 2,4-dimethylphenol, 2,5-dimethylphenol, 2,6-dimethylphenol, 3,4-dimethylphenol, 3,5-dimethylphenol and related phenolic materials having at least one aromatic hydrogen atom. A preferred phenolic reactant is 4-methylphenol.

A wide variety of olefins can be employed in the present process. Aliphatic branched chain monoolefins having 4 to 8 carbon atoms are particularly useful in the present process. Olefins having configurations that permit their attachment to the aromatic ring in the present process as tertiary alkyl groups are the most reactive in the process. A preferred olefin reactant is isobutylene. Other suitable olefins includes 3-methylbutene-1, 4-methylpentene-1, pentene-1, 3,3-dimethylbutene-1, 4,4-dimethylbutene-1, octene-1 and the like.

The catalyst in the present process is either methane disulfonic acid or methane trisulfonic acid. Methane disulfonic acid is sometimes called "methionic acid." Catalytic amounts of these catalysts are used, the amount being widely varied in accordance with usual practice. Typically, the amount of catalyst is varied between about .5% and 10% based on the weight of the phenolic reactant. The catalysts are conveniently employed in their hydrated form although they can be utilized in a non-hydrated form. Aqueous solutions of the catalysts can be suitably employed.

The present process of reacting a phenol and an olefin can be carried out either in a batch or a continuous manner. The molar proportions of the reactants can be widely varied in the process of the invention, although more usually substantially stoichiometric amounts are generally utilized. When an excess of one reactant is employed, usually this excess is the olefin as the olefin is generally in the form of a gas and can more conveniently be employed in an excess as well as oftentimes being less expensive than the phenol. A suitable inert solvent can be utilized in accordance with usual alkylation practice, although the reaction can be effected in the absence of a solvent when the phenolic reactant is a liquid under the reaction conditions. Atmospheric pressures are generally employed in the reaction, although subatmospheric or elevated pressures can be suitably employed. Pressures in the range of 1 to 100 atmospheres are typical. The reaction temperature likewise can be broadly varied, with temperatures of about −20° C. to 175° C. being suitable and temperatures of about 20° C. to 70° C. being preferred. The reaction is carried out until a substantial amount of the desired alkylation has taken place in accordance with usual practice, the reaction time varying with such reaction variables as the temperature, the concentration of catalyst, the phenolic reactant, the olefin reactant and the like. Reaction times can range from a few minutes to several hours.

The process of the invention is typically represented by the reaction of 4-methylphenol and isobutylene to prepare 2,6-ditertiary butyl-4-methylphenol, commonly called "BHT." BHT is a useful antioxidant and is widely employed as an antioxidant or stabilizer in fats and oils, vitamins such as vitamin A, plastics such as polyethylene and in numerous other substrates. The present preparation of BHT is represented by the following equation:

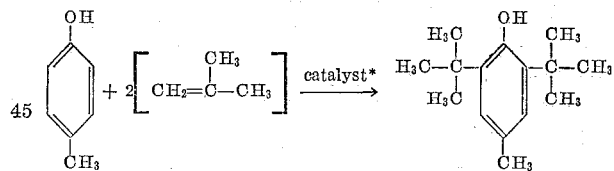

*Methane disulfonic acid or methane trisulfonic acid.

BHT prepared by the process of the invention wherein methane disulfonic acid or methane trisulfonic acid is utilized as the catalyst has improved color, odor and/or yield over BHT prepared with other acidic catalyst materials. In addition, the present process is characterized by a minimum of polymerization of the olefin during the reation, polymerization being a problem with some acidic catalyst materials.

The invention is further illustrated by the following examples of preferred embodiments thereof.

EXAMPLE 1

A 108 g. portion of 4-methylphenol, 100 ml. of benzene and 1.1 g. of methane disulfonic acid dihydrate were placed in a flask equipped with a stirrer, a thermometer, and a condenser cooled with Dry Ice and acetone. Then 112 g. of isobutylene gas was bubbled through the flask. During the first portion of the resulting reaction period the temperature of the reaction mixture varied between 25° and 40° C. due to the cooling effect of refluxing isobutylene. Thereafter, the reaction temperature was maintained at about 40° C. After 6 hours, the resulting supernatant liquid was decanted from the methane disulfonic acid catalyst. Unreacted portions of 4-methylphenol and 2-tertiary butyl-4-methylphenol were removed by extraction with aqueous sodium hydroxide. The 2,6-di-tertiary butyl-4-methylphenol product, after removal of the benzene solvent, was a white crystalline solid having substantially no odor. After one crystallization from about 50% aqueous methanol, the 2,6-ditertiary butyl-4-methylphenol product melted at 68–69° C. A conversion to 2,6-ditertiary butyl-4-methylphenol of 63% was obtained.

EXAMPLE 2

Example 1 was repeated except that 5.5 g. of methane disulfonic acid dihydrate was used as the catalyst in lieu of the 1.1 g. portion. The reaction temperature was easily maintained at 40° C. (±2° C.) over the 6 hour reaction period as the isobutylene appeared to react almost immediately upon contact with the 4-methylphenol. A conversion to 2,6-ditertiary butyl-4-methylphenol of 88% was obtained. The reaction was repeated except that a 5.5 g. portion of 1,2-ethane disulfonic acid was employed in lieu of the methane disulfonic acid dihydrate and a conversion yield of only 20% 2,6-ditertiary butyl-4-methylphenol was obtained. When benzene disulfonic acid is employed as the catalyst, a substantial amount of isobutylene is polymerized which leads to difficulty in the purification of the product. In addition, a benzene disulfonic acid catalyst cannot be satisfactorily recovered for reuse. As illustrated in Example 3 below, the methane disulfonic acid catalyst of the invention can be recovered and reused. When 5% portions of para-toluene sulfonic acid or sulfuric acid (based on the weight of the 4-methylphenol) are employed in lieu of the methane disulfonic acid as the catalyst, noticeably inferior 2,6-ditertiary butyl-4-methyl product colorwise and odorwise result.

EXAMPLE 3

Example 1 was repeated except that no benzene solvent was utilized and 2.2 g. of methane disulfonic acid catalyst recovered from the reaction of Example 2 was utilized. A conversion to 2,6-ditertiary butyl-4-methylphenol of 84% was obtained. The product was a white crystalline solid having substantially no odor.

EXAMPLE 4

Example 1 was repeated except that 1% by weight of technical grade methane trisulfonic acid trihydrate was employed as the catalyst. A conversion to 2,6-ditertiary butyl-4-methylphenol of 80% was obtained. The product was a white crystalline solid having substantially no odor.

The conversion data of Examples 1 to 4 above are summarized by the data in the following table.

Table

| Example No. | Catalyst | Percent catalyst conc. based on weight of 4-methylphenol | Percent 4-methylphenol recovered | Percent conversion to— | |
|---|---|---|---|---|---|
| | | | | 2-tert. butyl-4-methylphenol | 2,6-ditert. butyl-4-methylphenol |
| 1 | Methane disulfonic acid dihydrate. | 1 | 6 | 31 | 63 |
| 2 | ...do... | 5 | <1 | 11 | 88 |
| 3 | ...do... | 2 | 2 | 14 | 84 |
| 4 | Methane trisulfonic acid trihydrate. | 1 | <1 | 19 | 80 |

Thus, the present invention provides a new and useful process for alkylating phenols, and particularly a new and useful process for preparing 2,6-ditertiary butyl-4-methylphenol having improved properties with respect to odor and color. In addition, the present process is high yeilding and proceeds with a minimum of side reactions such as undesirable polymerization of the olefin reactant which characterizes many related processes. The improved results in the present invention result from the use of the specific catalysts methane disulfonic acid and methane trisulfonic acid, comparable results not being obtained with other acid materials including other closely related sulfonic acid materials and other acid materials.

Although the invention has been described in detail with reference to certain preferred embodiments thereof, it will be understood that variations and modifications can be effected within the spirit and scope of the invention as described hereinabove and as defined in the appended claims.

We claim:
1. The process for the nuclear alkylation of a phenol having at least one aromatic hydrogen atom which comprises reacting said phenol and an olefin at alkylating conditions in the presence of a catalytic amount of an alkane sulfonic acid selected from the group consisting of methane disulfonic acid and methane trisulfonic acid.

2. The process for the nuclear alkylation of a phenol having at least one aromatic hydrogen atom in an ortho position with respect to the hydroxyl radical which comprises reacting said phenol and a branched chain olefin having 4 to 8 carbon atoms at alkylating conditions in the presence of a catalytic amount of an alkane sulfonic acid selected from the group consisting of methane disulfonic acid and methane trisulfonic acid.

3. The process which comprises reacting 4-methylphenol and a branched chain olefin having 4 to 8 carbon atoms at a temperature of about −20° C. to 175° C. in the presence of a catalytic amount of an alkane sulfonic acid selected from the group consisting of methane disulfonic acid and methane trisulfonic acid, and forming a 2,6-ditertiary alkyl-4-methylphenol.

4. The process which comprises reacting 4-methylphenol and isobutylene at a temperature of about 20° C. to about 70° C. in the presence of about .5% to 10% by weight based on said 4-methylphenol of methane disulfonic acid and forming 2,6-ditertiary butyl-4-methylphenol.

5. The process which comprises reacting 4-methylphenol and isobutylene at a temperature of about 20° C. to 70° C. in the presence of about .5% to 10% by weight based on said 4-methylphenol of methane trisulfonic acid and forming 2,6-ditertiary butyl-4-methylphenol.

6. The process which comprises reacting 4-methylphenol and isobutylene at a temperature of about 20° C. to 70° C. and forming 2,6-ditertiary-butyl-4-methylphenol by effecting the said reaction in the presence of about .5% to 10% by weight based on said 4-methylphenol of an alkane sulfonic acid selected from the group consisting of methane disulfonic acid and methane trisulfonic acid.

References Cited in the file of this patent
UNITED STATES PATENTS 2,375,915   Grandel _____ May 15, 1945
2,733,274   Cowie _____ Jan. 31, 1956